United Sta
Smolinsky et al.

[11] 3,822,928
[45] July 9, 1974

[54] THIN FILM LIGHT GUIDE

[75] Inventors: Gerald Smolinsky, New Vernon; Ping King Tien, Chatham Twp., Morris County; Michael Joseph Vasile, North Plainfield, all of N.J.

[73] Assignee: Bell Telephone Laboratories, Incorporated, Murray Hill, Berkeley Heights, N.J.

[22] Filed: May 29, 1973

[21] Appl. No.: 364,502

Related U.S. Application Data

[63] Continuation of Ser. No. 168,033, Aug. 2, 1971, abandoned.

[52] U.S. Cl. ...... 350/96 WG, 117/218, 350/175 GN
[51] Int. Cl. .............................................. G02b 5/14

[58] Field of Search .............................. 350/96 WG

[56] References Cited
UNITED STATES PATENTS

| 3,434,774 | 3/1969 | Miller .......................... 350/96 WG |
| 3,694,055 | 9/1972 | Bergman et al. .......... 350/96 WG X |

*Primary Examiner*—John K. Corbin
*Attorney, Agent, or Firm*—E. M. Fink

[57] ABSTRACT

Thin film light guide circuit utilizing electromagnetic radiation comprising a defect-free, essentially homogeneous polymeric film produced by in situ polymerization of at least one monomer within a plasma discharge region.

7 Claims, 5 Drawing Figures

3,822,928

THIN FILM LIGHT GUIDE

CROSS-REFERENCE TO RELATED APPLICATION

This application is a continuation-in-part of my copending U.S. Pat. application. Ser. No. 168,033, filed Aug. 2, 1971, now abandoned.

BACKGROUND OF THE INVENTION

This invention relates to a thin film light guide circuit. More particularly, the present invention relates to thin film visible and near-visible light guide circuits including single or multiple layers of plasma deposited polymeric materials and to methods for their preparation.

DESCRIPTION OF THE PRIOR ART

Since the introduction of solid and gas lasers more than a decade ago, there has been a birth of interest in a class of optoelectronic devices relying upon the use of a gaussian light beam in a solid crystal for their operation. Typical of devices falling within the scope of this class are optical modulators, frequency mixers, parametric oscillators, and the like. Recently, workers in the art have focused their interest upon the concept of integrated optics, that is, the application of thin film technology to optical circuits and devices.

At an early stage in the development of integrated or thin film optics, the need for a planar thin film light guide manifesting a higher level of efficiency than its solid counterpart was recognized as were the numerous advantages thereof. Initial efforts toward this end involved the use of diverse inorganic materials, the most prominent of which are zinc oxide and zinc sulfide. Unfortunately, studies have revealed that the microcrystalline nature of such materials contributes in large measure to the high scattering loss of a light wave propagating inside the material. Accordingly, efforts have continued toward the development of a low loss material for use as a light guide.

SUMMARY OF THE INVENTION

In accordance with the present invention, this end is attained by means of a process which yields a clear, smooth, pinhole-free film suitable for use as a light guide. Techniques are also described for the fabrication of a thin film light guide manifesting a refractive index profile which may be controllably varied either during the preparative process or subsequent thereto.

Briefly, the light guides described herein are obtained by depositing at least one guiding element upon a substrate member having a different refractive index at a wavelength of electromagnetic radiation than the substrate by in situ polymerization of at least one monomer within a plasma discharge region utilizing radio frequency energy.

BRIEF DESCRIPTION OF THE DRAWING

The invention will be more fully understood by reference to the following detailed description taken in conjunction with the accompanying drawing wherein.

DETAILED DESCRIPTION

Figure 1:
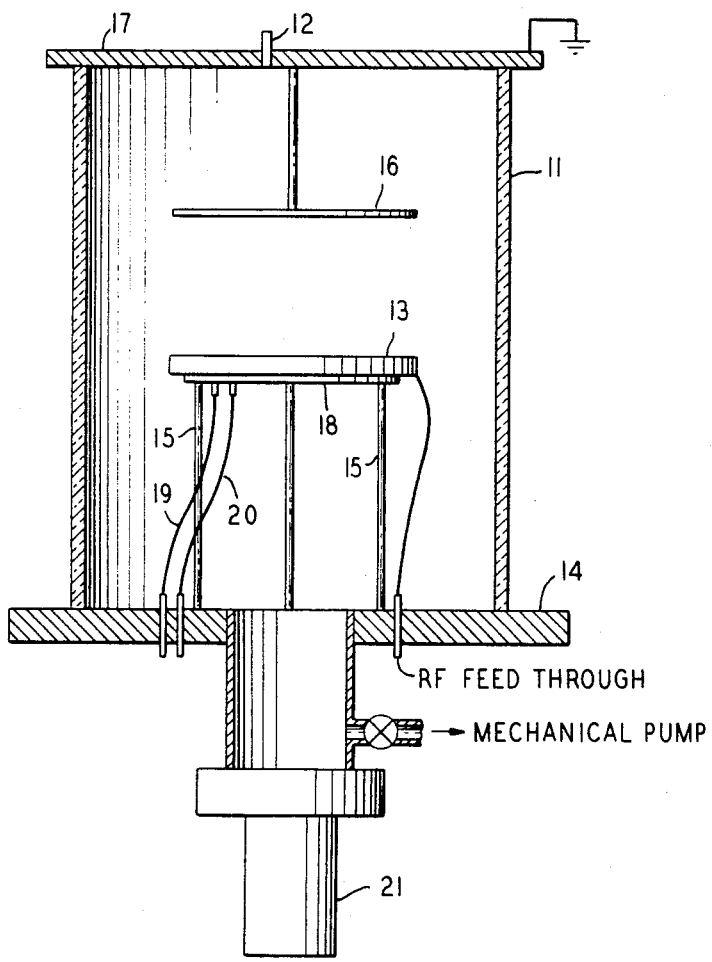
FIG. 1 is a schematic representation of a glow discharge reaction chamber suitable for use in the practice of the present invention.

With reference now more particularly to FIG. 1, there is shown a vacuum chamber 11 wherein polymerization of monomeric materials occurs. Chamber 11 includes a monomer and gas inlet means 12 through which pass monomers and inert gases into the plasma which is generated by any suitable means, as by the use of radio frequency energy. Shown disposed within chamber 11 are lower electrode 13, supported above base plate 14 by insulated legs 15, upper electrode 16 supported from upper plate 17 and cooling means 18 for cooling electrode 13 during the polymerization process, a coolant being circulated to means 18 through conduits 19 and 20. With the assistance of a pressure indicating device, such a manometer, not shown, pressure is maintained at a level which results in polymer deposition upon a substrate member which is positioned upon electrode 13. A pumping means 21 is used to evacuate chamber 11 prior to initiating the process.

A large number of reactant materials may be selected for use in the practice of the present invention. Broadly, it has been found that any organic material having a boiling point less than 150° C will yield a smooth pinhole-free film suitable for use as a light guide when polymerized in the described manner. This includes hydrocarbons of the aliphatic and aromatic variety, ethers, alcohols, halogenated hydrocarbons, ketones and silicones. Representative monomeric reactants include cyclohexane, acetone, hexene-1, isopropyl alcohol, perfluorocyclohexene, diethylether, vinyltrimethylsilane, hexamethyldisiloxane, etc. The primary requirement of the monomer selected is that it have a sufficient vapor pressure to enter the reaction chamber in vapor form and a boiling point less than 150° C.

As noted above, from a device standpoint, it is advantageous to deposit the polymeric films either singly, in combination with each other, or in sequential order for the purpose of obtaining the desired refractive index whether it be stable or variable in value.

The inert gas selected for use herein is selected from among helium, neon, argon, krypton, xenon, hydrogen or mixtures thereof. Undesirable contaminants which may enter into the reaction or impede the polymerization process are excluded. Much of the work described was conducted with argon which is considered a preferred inert medium because of its relatively low ionization potential.

In the operation of the polymerization process, chamber 11 is first evacuated by pumping to the desired pressure by the use of pumping means 21. Under ordinary conditions, the operating pressure should not exceed about 5 millimeters of mercury. Deposition ordinarily is conducted at about 0.5 millimeters of mercury, such representing a preferred pressure. A lower limit is dictated primarily by expediency. The pressure to which chamber 11 is initially evacuated is generally much less than that of the operating pressure, since the introduction of plasma and reactant increases the value. This is done to eliminate adsorbed contaminants from the system. After evacuating chamber 11 to the desired level, the pumping is switched from a diffusion to a mechanical pump and monomer or monomers in combination with an inert gas is introduced through gas inlet means 12 to the desired partial pressures. A plasma is then generated in the system by any suitable means such as by the use of radio frequency energy applied across electrodes 13 and 16. In much of the work reported herein, power input varied between 150 to 200 watts at a frequency of 13.56 megahertz. Any power level and frequency resulting in a glow discharge is acceptable. The process is then maintained at continuous flow conditions for a time period sufficient to yield the required film thickness on the substrate.

Figure 2:
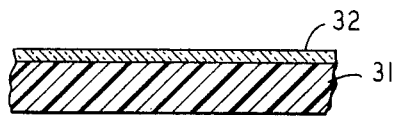
FIG. 2 is a front elevational view in cross section of a typical substrate member bearing a guiding element prepared in accordance with the described technique.

FIG. 2 is a front elevational view in cross section of a typical substrate member as, for example, glass microscope slide 31 upon which has been deposited a thin film of a polymeric material 32 of the type described herein, material 32 being suitable for use as a guiding element in a thin film light guide circuit.

Figure 3:
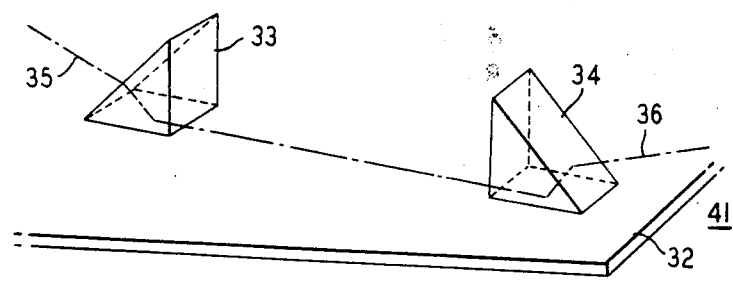
FIG. 3 is a perspective view of a device in accordance with the invention.

With reference now to FIG. 3, there is shown a perspective view of a device in accordance with the invention. The device 31 consists of film 32 prepared by in situ polymerization of a monomer in a plasma discharge region as previously described. Means 33 and 34 are provided for introducing and extracting radiation. Introduced radiation is indicated as arrow 35; extracted radiation as arrow 36. Passage of the radiation within the device is also indicated by arrows. Radiation 35, generally coherent, may be introduced by any suitable device, for example, by a laser. Means not shown may be provided for polarizing the incoming or the outgoing radiation and may also be provided for resonating any one or more of the waves involved. The particular coupling means 33 and 34 depicted are described in detail in Vol. 14, Applied Physics Letters, p. 291 (1969). Other means which may singly consist, for example, of one or more optically polished surfaces may be provided.

In the experimental system employed in the preparation of the described coatings, it has been found essential to select operating conditions which preclude polymerization in the void, that is, the region intermediate the electrodes. Although several prior art techniques have been described for the polymerization of monomeric materials in a plasma, and although the resultant films have been clear, smooth, pinhole-free films, they have not been free of inhomogeneities, so precluding their suitability for light guide applications. Studies have revealed that in most growth processes an increasing growth rate causes the formation of microscopic nodules of polymer which become embedded in the deposited polymeric film. The number, density and size of these snowball-like defects is proportional to the film deposition rate for any total pressure monomer concentration. These defects not only cause scattering losses of a propagating light wave in the film but in severe cases create a non-uniform surface which is detrimental in light guide applications. The subject technique yields an essentially defect-free film and it is in this area in which a significant stride has been made with respect to the prior art. This end has unexpectedly been attained by carefully controlling the operating parameters during the polymerization process of the described materials. The precise parameters required for each material can only be determined experimentally and the most convenient procedure for attaining this end involves the following steps. Initially, the polymeric film of interest is deposited upon a smooth surface, as, for example, a glass microscope slide or a sheet of aluminum in the manner described above with an arbitrary power-pressure relationship. Thereafter, the deposited film is scanned with an electron microscope at 5,000 to 10,000 times magnification to determine if inhomogeneities in the surface are present. If the film is of poor quality, the rate of deposition is then lowered by maintaining the pressure and flow conditions in the vacuum system constant, while decreasing the power. Alternatively, this end may be attained by maintaining the power constant and varying the pressure and flow conditions of the monomer. This precedure is followed until no visible defects are observed. In this manner, the range of acceptable operation for the production of defect-free materials is determined. Deposition is then continued in accordance with the experimental schedule.

EXAMPLES

The polymeric films described below were prepared in an apparatus similar to that shown in FIG. 1 wherein the vacuum chamber was a glass cylinder, 20 centimeters in diameter, and 21.1 centimeters in height. The substrates employed were 1 inch × 3 inches glass microscope slides which were placed upon the bottom electrode of the apparatus, a 15 centimeter diameter brass plate fitted with a copper cooling coil. Four centimeters above the bottom electrode, a congruent steel plate was positioned to serve as a ground electrode. Monomers and argon were introduced into the system through separate variable leak valves, the monomer reservoir having been preheated to a temperature dependent upon the volatility of the monomer.

In the operation of the process, the vacuum chamber was initially evacuated to a pressure less than $2 \times 10^{-6}$ torr and the active electrode maintained at 25° C with circulating water from a constant temperature bath. A monomer comprising vinyltrimethylsilane, hexamethyldisiloxane or combinations thereof and argon were metered into the chamber to a pressure of 0.3 and 0.1 torr, respectively, while the system was continuously pumped with a mechanical pump. A discharge was established by coupling 150 watts of RF energy from a 13.56 mHz generator to the electrodes. The operating parameters selected were determined by experimental techniques involving deposition and electron microscope scanning as described above. Polymer formation began immediately, the vinyltrimethylsilane growing at the rate of 2,000 angstroms per minute and the hexamethyldisiloxane growing at a rate of approximately 1,000 angstroms per minute. Studies of the resultant films revealed that vinyltrimethylsilane (1), and hexamethyldisiloxane (2),

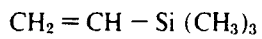

(1)

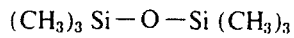

(2)

undergo ionization and fragmentation in the discharge, so yielding a highly crosslinked insoluble polymer which evidences a carbon-silicon ratio appreciably less than that of the starting monomer.

Subsequent to the deposition of these films, various tests were performed. Initially, light wave propagation tests were run by feeding a light wave into the right side of a coated glass slide by a prism film coupler, the light wave being propagated inside of the film and removed from the left side of the slide by a second prism film coupler. Each of the films examined had several waveguide modes but only one at a time was used for light wave propagation. Excitation of each of the waveguide modes was effected by varying the direction of the laser beam incident on the prism.

This generic procedure was repeated utilizing a film deposited with a tapered edge on a glass slide, the light wave initially entering the substrate and then the film at the tapered edge. The results obtained were similar to that obtained in the previous run.

The refractive indices of more than 50 vinyltrimethylsilane and hexamethyldisiloxane films deposited on glass substrates under varying combinations of RF power, total pressure and partial pressure of monomer and/or argon were then determined by the prism coupler method. The refractive indices of chemically and thermally treated vinyltrimethylsilane films were found to vary only about five parts in 1,000.

$\eta_{6328} \mu_m(\text{red}) = 1.5279 - 1.5356$ $\eta_{5145} \mu_m(\text{green}) = 1.5370 - 1.5440$ $\eta_{4880} \mu_m(\text{blue}) = 1.5398 - 1.5469$ Typical hexamethyldisiloxane films evidenced a refractive index of 1.4880 at .632$\mu$m, 1.4960 at .5145$\mu$m and 1.4996 at 4.880$\mu$m. Remeasurement of the refractive indices of the noted films after several months revealed no noticeable change.

Scattering losses in the prepared films were determined by means of a pair of prism film couplers. One prism film coupler was used to excite a light wave in the vinyltrimethylsilane and/or hexamethyldisiloxane films and a second coupler situated several centimeters from the first was used to couple the light wave out of the film. The efficiency of the output coupler was adjusted in each case to 100 percent. The output coupler was applied at several points along the light streak, coupling being adjusted at each point until the streak disappeared completely beyond the coupling point. The light emerging from the output prism was then detected. The measured loss in several vinyltrimethylsilane films at 0.6328$\mu$m is less than 0.04db per centimeter to an accuracy of 0.1db over a distance of 3½ centimeters. These films were then compared with vinyltrimethysilane films having snowball defects. The latter evidenced losses larger than 0.5db per centimeter, while two films prepared under heavy snowstorm conditions (visible precipitation) did not propagate the light wave in one case and evidenced a loss greater than 10db in the other.

Figure 4:
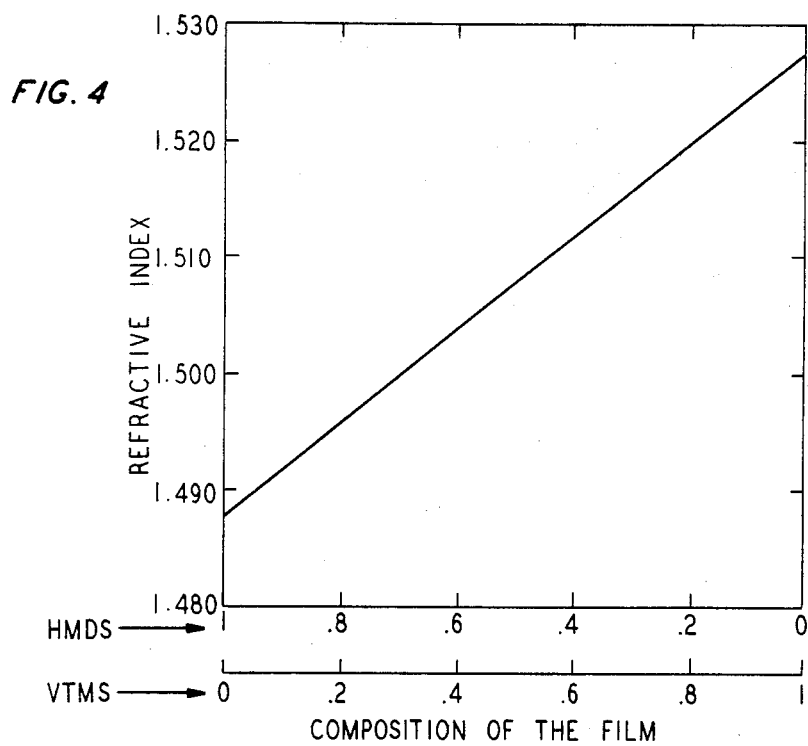
FIG. 4 is a graphical representation on coordinates of film composition versus refractive index showing the refractive index profile as a function of film composition for vinyltrimethylsilane-hexamethyl-disiloxane films deposited in the described manner.

In order to obtain a refractive index profile which decreases parabolically from the center plane toward the upper and lower surfaces, films were prepared in the manner set forth above utilizing continuously varying mixtures of vinyltrimethylsilane and hexamethyldisiloxane monomers. Mixtures of fixed rather than varying concentration permitted the preparation of films whose refractive indices ranged from just below to slightly above that of ordinary glass. The monomers were stored in different reservoirs and metered into the reaction chamber independently. The ratio of the partial pressures of the two monomers was varied but the combined total pressure was maintained at 0.3 torr. The deposited films had a thickness of about 3 microns. Refractive indices of the deposited films were measured by the prism film coupler using a 0.6328$\mu$m helium-neon laser. The results of such testing are shown graphically in FIG. 4 on coordinates of film composition versus refractive index. It is noted by reference to the Figure that a linear relationship exists for refractive index as a function of monomer mixture composition, so indicating the ease with which the refractive index of a film may be controlled and suggesting a wide variety of electrooptic applications therefor. Thus, it is evident by the use of this procedure that one can obtain polymeric films having a dielectric field with a refractive index varying with thickness.

Figure 5:
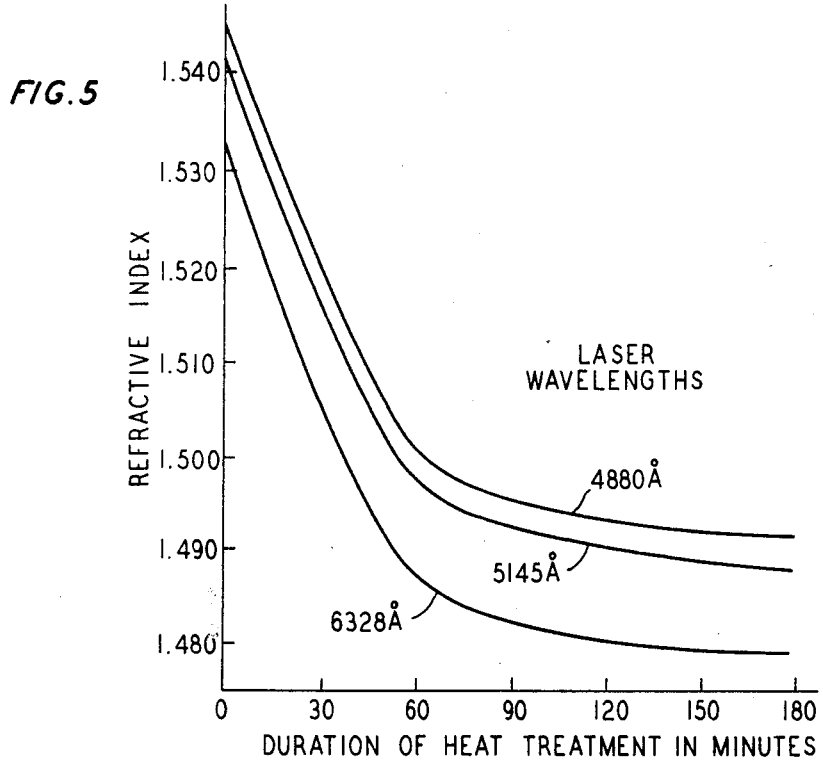
FIG. 5 is a graphical representation on coordinates of duration of heat treatment in minutes against refractive index showing the refractive index variation as a function of time of heating of vinyltrimethylsilane films in oxygen.

A procedure for varying the refractive index of a deposited film after deposition was then conducted. This involved heating the deposited films for a prescribed period of time in an oxygen ambient. The vinyltrimethyl-silane films deposited in the manner described above were heated at 140° C in an oxygen ambient for time periods ranging up to 180 minutes. At the conclusion of this time period, no deleterious affects in the optical quality of the polymer were observed. However, the refractive index was found to decrease with increased time of heating as graphically shown in FIG. 5. Shown in the Figure is a graphical representation on coordinates of heating time against refractive index at three wavelengths, 6,328 angstroms, 5,145 angstroms and 4,880 angstroms. It is noted that at a wavelength of 0.6328$\mu$m the index decreases 3½ percent in 180 minutes from 1.5310 to 1.4797. The graphical data immediately suggests that this procedure may be used as a means for trimming the resonant frequency of certain electrooptic devices or alternatively in thin film parametric devices including a semiconductor film of a thickness required by the phase match condition of the parametric interaction. In the latter case, the use of polymeric films of the type described herein serve to protect the semiconductor film and simultaneously satisfy phase match conditions by varying the value of the refractive index.

This invention has been described in terms of a limited number of embodiments. However, it will be understood that the scope of the appended claims encompasses all processes and device variations utilizing thin film light guides.

What is claimed is:

1. Thin film circuit for use with electromagnetic radiation including a substrate member having at least one guiding element in contact therewith, together with means for introducing wave energy into and means for extracting wave energy from said guiding element, said element and said substrate having differing refracting indices at a wavelength of electromagnetic radiation, characterized in that said element is an essentially homogeneous, clear, smooth, pinhole-free, deposited polymer which is free from light scattering defects and which is produced by in situ polymerization of at least one monomer within a plasma discharge region, said region including at least a portion of the said substrate.

2. Circuit in accordance with claim 1 wherein said plasma deposited polymer is an organic material having a boiling point less than 150° C.

3. Circuit in accordance with claim 2 wherein said polymer is deposited from vinyltrimethylsilane.

4. Circuit in accordance with claim 2 wherein said polymer is deposited from hexamethyldisiloxane.

5. Circuit in accordance with claim 1 wherein said plasma deposited polymer comprises multiple layers of polymer having differing refracting indices.

6. Circuit in accordance with claim 5 wherein said polymer is deposited from a mixture of hexamethyldisiloxane and vinyltrimethylsilane.

7. Circuit in accordance with claim 1 wherein said plasma deposited polymer comprises a single layer of polymer having a refractive index which decreases parabolically from the middle plane to the top and bottom surfaces.

* * * * *